United States Patent
Guillard

[11] Patent Number: 6,114,975
[45] Date of Patent: Sep. 5, 2000

[54] METHOD OF AIR NAVIGATION ASSISTANCE FOR GUIDING A MOVING VEHICLE TOWARDS A MOVING TARGET

[75] Inventor: Patrice Guillard, Valence, France

[73] Assignee: Sextant Avionique, Velizy Villacoublay, France

[21] Appl. No.: 09/147,726
[22] PCT Filed: Sep. 2, 1997
[86] PCT No.: PCT/FR97/01545
  § 371 Date: Feb. 24, 1999
  § 102(e) Date: Feb. 24, 1999
[87] PCT Pub. No.: WO98/10308
  PCT Pub. Date: Mar. 12, 1998

[30] Foreign Application Priority Data

Sep. 3, 1996 [FR] France ............................. 96 10718

[51] Int. Cl.⁷ .................................................. G08B 21/00
[52] U.S. Cl. ....................... 340/945; 342/357.01; 342/457
[58] Field of Search ............................. 340/945; 342/457, 342/357.08, 357.01, 357.03, 357.06

[56] References Cited

U.S. PATENT DOCUMENTS

| | | | |
|---|---|---|---|
| 4,894,655 | 1/1990 | Joguet et al. | 340/945 |
| 5,160,935 | 11/1992 | Inamiya | 342/357 |
| 5,311,194 | 5/1994 | Brown | 342/357 |
| 5,331,329 | 7/1994 | Volkov et al. | 342/357 |
| 5,587,715 | 12/1996 | Lewis | 342/357 |
| 5,831,576 | 11/1998 | Sheynblat | 342/357 |
| 5,949,375 | 9/1999 | Ishiguro et al. | 342/457 |

*Primary Examiner*—Daniel J. Wu
*Assistant Examiner*—John Tweel, Jr.
*Attorney, Agent, or Firm*—Oblon, Spivak, McClelland, Maier & Neustadt, P.C.

[57] ABSTRACT

A method of air navigation for guiding a moving vehicle toward a moving target. Both the moving vehicle and the moving target use satellite positioning receivers. Instead of transmitting the position computed by the target to the vehicle, only the pseudo-range and pseudo-velocity measurements between the target and the satellites are transmitted by radio to the vehicle. The pseudo-range, pseudo-velocity and measuring time measurements of the moving vehicle are carried out. The vehicle then determines the satellites used by both the vehicle and target. The target then subtracts for each of the satellites the pseudo-range and pseudo-velocity measurements determined by the vehicle from those received by the target and computes on the basis of these answers, relative speed vectors between the vehicle and the target. This is particularly useful for airplanes or helicopters landing on the decks of ships, a rendezvous in the air, at sea or in space and homing vehicles onto a marker.

11 Claims, 3 Drawing Sheets

METHOD OF AIR NAVIGATION ASSISTANCE FOR GUIDING A MOVING VEHICLE TOWARDS A MOVING TARGET

This application is a 371 of PCT/FR 97/0154 dated Sep. 2, 1997.

BACKGROUND OF THE INVENTION

1. Field of the Invention

The invention relates to assistance with navigation or with piloting, with a view to directing a mobile towards a target which can move or more generally towards a target whose exact position is not known a priori. This navigation or this piloting is referred to hereinafter as "relative navigation"; the mobile will be referred to as the "hunter", the objective of the hunter being the target.

The applications envisaged here are in particular the following:

landing of a helicopter or of an aircraft on a ship, or an oil platform, space rendezvous, rendezvous between surface ships or submarines, pursuit of one vehicle by another, in-flight refuelling, motion of vehicles in formation while remaining a specified distance from a leader, motion of vehicles towards a beacon at sea (for ships) or on the ground (for helicopters or terrestrial vehicles) although the position of the beacon is not known a priori, motion towards points whose positions are known with respect to a beacon although the position of the beacon itself is not known.

The applications envisaged are applications in which the accuracy of positioning is a predominant parameter.

2. Discussion of the Background

The systems proposed hitherto for these applications are not sufficiently accurate or demand calculating powers which are too large to allow real-time applications with sufficient accuracy. For the case of aircraft landing on an aircraft carrier, it is understood that the calculation must be performed in real time with great accuracy and a high rate of information refresh.

The following procedure could be used: a satellite-based positioning receiver placed on the target sends its position to the hunter by radio. Another receiver on the hunter calculates its position and performs a subtraction between the two calculated positions so as to determine the components of a vector joining the mobile to the target. The pilot of the mobile uses these components as an aid for steering towards the target.

This solution is not satisfactory owing to the uncertainties which affect the position information calculated by the receivers. It is recalled that the positions are calculated with a certainty tied to the clock fluctuations of the signals transmitted by the satellites.

SUMMARY OF THE INVENTION

The invention proposes a solution for facilitating, at the least cost, relative navigation of a hunter towards a target, this solution making it possible in particular to provide a fast rate of the most exact possible relative navigation information with means which are limited in terms of necessary computing power.

The invention relies on the sending by the target to the hunter of raw measurements of pseudo-distances between the receiver of the target and each of the satellites which this receiver can validly use, together with the identification of the satellites. The receiver of the target does not send any result of calculation of its own position in relation to a terrestrial reference marker. The hunter makes its own measurements of pseudo-distances then processes directly by calculating the differences of pseudo-distances so as to calculate the components of a relative-position vector joining the hunter to the target in relation to a terrestrial reference marker.

Likewise, the target can send raw measurements of relative pseudo-velocities between the target and each of the satellites, without sending any result of calculation of velocity in relation to a terrestrial reference marker. The hunter receives these measurements, calculates differences between its own measurements of pseudo-velocities and those which it receives from the target and performs a calculation directly on these differences which culminates in the components of a vector of relative velocity between the mobile and the target in relation to a terrestrial reference marker.

The terrestrial reference marker will in practice be the local geographical reference marker with three axes: longitude axis, latitude axis, and altitude axis.

The calculations of relative position and velocity will be made in this local reference marker, but the relative-navigation information may be displayed, after a change of coordinates, in relation to a reference marker tied to the target, on condition that the target transmits its attitude to the hunter.

More precisely, the invention proposes a process for aiding the piloting of a hunter towards a target, using a first satellite-based positioning receiver associated with the target to provide position and velocity measurements tied to the position and to the velocity of the target, a second satellite-based positioning receiver associated with the hunter to provide position and velocity measurements tied to the position and to the velocity of the hunter, and using radio transmission means to transmit information from the target to the hunter, this process being characterized in that the target periodically transmits, to the hunter, measurements of pseudo-distances representing the distance of the target from n different satellites at a given instant, the identification of these n satellites, a value of the instant of the measurement, measurements of relative pseudo-velocities between the target and each satellite, in that the second receiver is employed to perform periodic measurements of pseudo-distances, pseudo-velocities and measurement instant, the p satellites used both by the hunter and by the target are determined in the hunter, the pseudo-distances and pseudo-velocities determined by the hunter and those received from the target are subtracted for each of the p satellites, and relative position and velocity vectors are calculated directly from the results of these subtractions, in relation to a terrestrial reference marker between the hunter and a sighted point tied to the target.

The invention also relates to a system for aiding the piloting of a hunter towards a target, comprising, in the hunter, a satellite-based positioning receiver and radio reception means for receiving from the target on the one hand measurements of pseudo-distances and of pseudo-velocities tied to the position of the target with respect to n satellites and on the other hand the identification of these n satellites, this system being characterized in that it comprises, in the hunter, means for calculating, using the satellite-based positioning receiver, pseudo-distances and pseudo-velocities of the hunter with respect to several satellites, means for determining the satellites used both by the target and by the hunter, means for subtracting, satellite by satellite, the measurements of pseudo-distances of the hunter and of the target and the measurements of pseudo-velocities of the hunter and of the target, and means for calculating directly from the results of these subtractions, relative position and velocity vectors in relation to a terrestrial reference marker between the hunter and a point tied to the target.

In the case in which the target transmits moreover to the hunter information regarding its attitude, the system on board the hunter can moreover comprise means for changing the coordinates of the relative position and velocity vectors and for providing relative velocity and position indications in relation to a reference marker tied to the target.

BRIEF DESCRIPTION OF THE DRAWINGS

Other characteristics and advantages of the invention will become apparent on reading the detailed description which follows and which is given with reference to the appended drawings, in which.

DETAILED DESCRIPTION OF THE PREFERRED EMBODIMENTS

Figure 1:
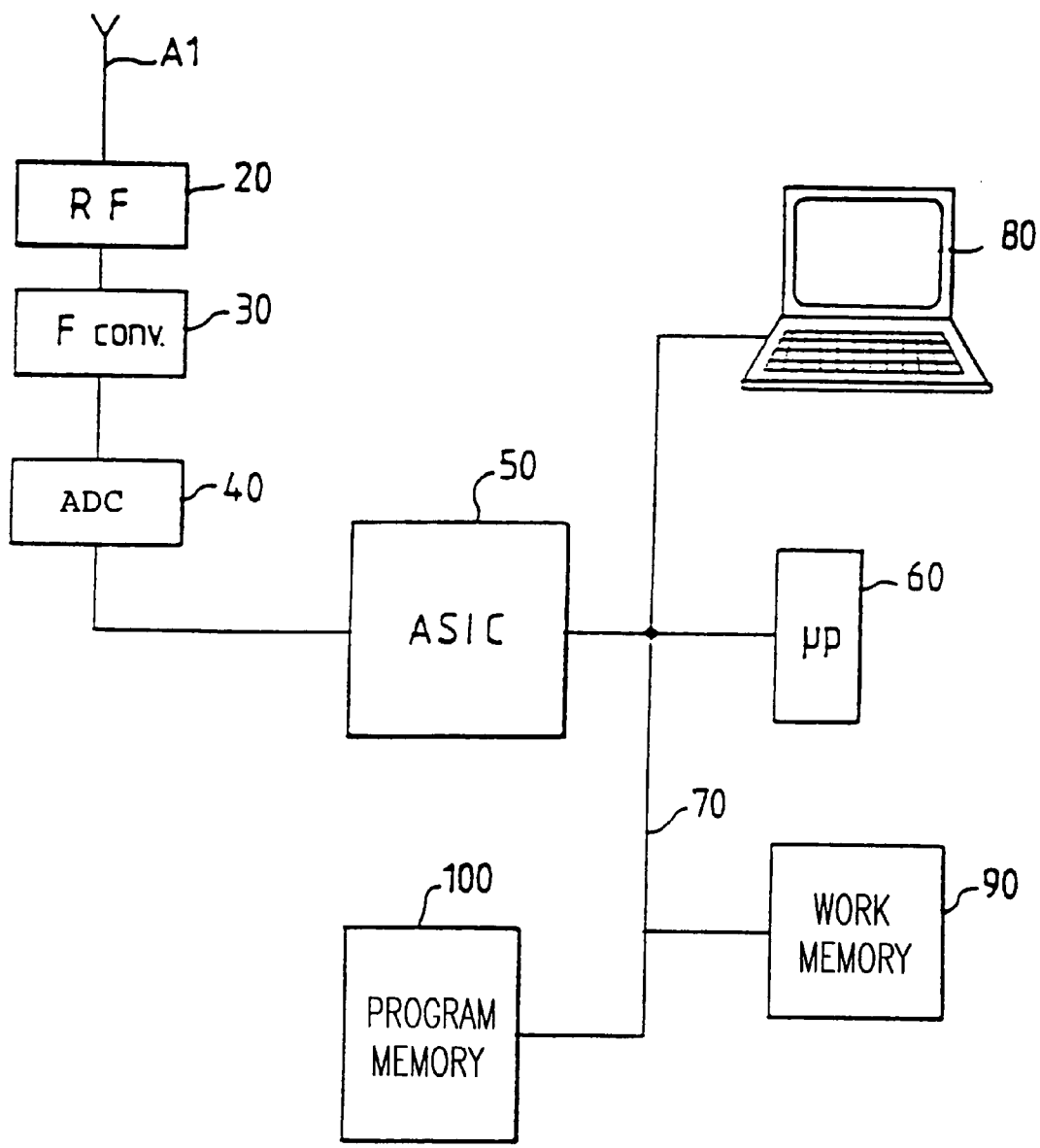
FIG. 1 represents the general structure of a GPS receiver.

The invention will be described more precisely in the case of the landing of an aircraft on a ship, which is a particularly difficult operation for the pilot of the aircraft owing to the small size of the target, to the absence of absolute knowledge regarding the exact position thereof in relation to a terrestrial reference marker, and owing to the motion thereof which may be due to its own forward movement or to the action of the sea (swell, wind).

The pilot is particularly in need of piloting assistance so as to steer towards the target. This assistance is necessary at the moment of landing, and also possibly when the aircraft is far away and is searching for the ship under conditions of no visibility.

The invention proposes to use satellite-based positioning receivers in a particular manner, and firstly, therefore, the principles of operation of these receivers will be recalled in the case of the GPS (Global Positioning System) system which is the most widespread.

The GPS system uses a constellation of satellites which circulate the Earth in very accurately determined orbits, that is to say it is possible to ascertain the position of any satellite at any instant. The satellites transmit radiofrequency signals containing navigation data and codes which make it possible to identify each satellite. These codes phasemodulate a carrier frequency. A GPS receiver, on the ground or on a land, air or sea vehicle, can receive signals from several satellites simultaneously, accurately calculate its distance from each of the satellites, or pseudo-distance, and deduce from this its precise position in terms of latitude, longitude and altitude, in relation to a terrestrial reference marker. It can also deduce from this the date and precise time of reception in the temporal reference marker of the GPS system. Finally, it can deduce from this, by Doppler measurements, its own velocity vector in relation to the terrestrial reference marker.

In the GPS system, each satellite is identified by a pseudo-random code which is peculiar to it and which repetitively modulates (every millisecond for example) a carrier frequency transmitted by the satellite. There are systems akin to GPS, especially the GLONASS system, in which this pseudo-random code is also present although it does not serve to identify an individual satellite.

The pseudo-random code is a long code (1023 bits at 1.023 MHz, i.e. 1 millisecond), and one of its main functions is to allow the extraction of the signal from the satellite at a much higher noise level (30 dB for example) than the level of the signal. This technique is now well-known by the name of spread spectrum transmission. The signal is extracted from the noise by virtue of a correlation operation, in the receiver, between the signal received and a periodic pseudo-random code which is identical to that which is expected to be found in the signal. If the codes do not coincide temporally, there is no correlation between the signals received and the local code generated by a local code generator; if they almost coincide, there is some correlation, and the more exact the coincidence, the larger the correlation energy. It is therefore possible to establish a correlation signal making it possible to slave a local code generator until exact coincidence of the local code and of the code modulating the signal transmitted by the satellite is obtained. A code slaving loop then makes it possible to maintain this coincidence.

The pseudo-random code is transmitted by the satellite at extremely precise instants which are known at receiver level. The correlation operation is employed to determine the instant of arrival of this code in the receiver: the characteristic instant or epoch of transmission of the local code is determined, and since this local code coincides with the code received when the maximum correlation is established, this instant represents the instant of arrival of the code received. The difference between an instant of transmission of the code by the satellite and an instant of reception of the code by the receiver makes it possible to determine a time of travel of the signals between the satellite and the receiver. Given that the velocity of travel of the signals is the velocity of light, it is possible to calculate the pseudo-distance, that is to say the distance between the receiver and a given satellite. The same operation carried out on two other satellites makes it possible, by triangulation, to determine the exact position of the receiver with respect to the three satellites if the position of these satellites is known.

By using a fourth satellite, the clock errors of the receiver are eliminated, the clock of the receiver not being as accurate as that of the satellites. In addition to the position of the receiver, it is then possible to calculate an accurate time of the position measurement, in the time reference marker of the GPS satellites.

The position of each of the satellites is known at any instant: it is calculated from tables which are stored in the receiver and are updated by the navigation message broadcast by the satellites. The velocity of the satellites at any instant may also be calculated from these tables.

It is possible to deduce, from the signals sent by four satellites, the time and the distance of the receiver with respect to the four satellites. Also, by a change of coordinates, the position of the receiver is obtained in a fixed terrestrial reference marker.

Likewise, the velocity of the receiver is calculated from a measurement of Doppler effect on the carrier frequency of the radiofrequency signal sent by the satellites. It is therefore possible to calculate the pseudo-velocities, that is to say the relative velocities of the receiver with respect to each of the satellites, along the director axis which joins this satellite to the receiver. Four satellites are necessary to eliminate the ambiguity in the time. Four different relative-velocity vectors are obtained on the director axes joining the receiver to the four satellites. Simple calculations make it possible to determine the velocity of the receiver along three axes in relation to the terrestrial reference marker from these four velocity vectors and the following information:

the directions of the receiver/satellite director axes with respect to a fixed terrestrial reference marker (longitude, latitude, altitude); these directions are themselves obtained by virtue of knowing the position of the receiver at a given instant and the position of each satellite at the same instant;

the individual velocities of the satellites in relation to the terrestrial reference marker at this instant.

If more than four satellites are used, a redundant item of information is obtained. This is the case for the professional-grade receivers used in particular in aeronautics. This redundant item of information makes it possible to eliminate satellites which would provide a defective item of information. The item of information is regarded as defective since it is not consistent with the set of measurements performed.

With more than four satellites, the position calculations are more complicated and generally involve an approximation by the method of least squares to find the point which corresponds best to the set of measurements obtained for the various satellites.

FIG. 1 summarizes the general principle of a GPS receiver. The receiver includes a radiofrequency part, comprising an antenna A1, a radiofrequency amplifier 20 and various associated filtering circuits, frequency conversion circuits 30, and an analog/digital converter 40. The converter makes it possible to provide relatively low frequency digital signals intended to be processed in a digital signal processing circuit 50. This circuit is controlled by a microprocessor 60 and associated calculation and control software.

The microprocessor 60 has two functions:
  on the one hand, it computes digital data used by the digital signal processing circuit 50 from digital data provided by this circuit; in particular, it performs digital calculations required by the digital slaving loops present in the digital processing circuit 50;
  and, on the other hand, it provides the user with definitive results of calculating position, time and velocity, that is to say either on a digital display screen or on a digital bus to other apparatus which need the results.

Obviously, these two functions could be performed by two separate processors. In the embodiment with a single microprocessor 60, the following have been represented: a bus 70 for exchanges between the microprocessor 60, the processing circuit 50, an input/output peripheral 80, the work memories 90, and the program memories 100 which contain the programs required for the operation of the microprocessor.

Very briefly, the digital signal processing circuit comprises either a single processing channel, the information emanating from the various satellites being processed in a multiplexed manner, or preferably several channels working in parallel each on a specified satellite.

Each channel comprises a double slaving loop: carrier phase slaving and code phase slaving.

The carrier phase loop essentially uses a local oscillator with digital phase control, which provides a periodic (sawtooth) digital phase at a frequency corresponding to the transposed carrier frequency, by taking account of the Doppler effect which affects the carrier frequency transmitted by a satellite. The Doppler effect is taken into account by virtue of the very existence of the slaving loops. The microprocessor 60 calculates a carrier phase error signal; this signal serves to control the local oscillator so as to slave a local carrier frequency to the carrier frequency received from the satellite.

The code phase slaving loop comprises a local code generator driven by an oscillator with digital phase control. It makes it possible to slave the local codes to the code received from the satellite and to be able subsequently to determine the exact temporal position of the local codes thus slaved. The local code is correlated with the code received from the satellite; the correlation signal is calculated by the microprocessor and serves to slave the loop so as to bring the local code into synchronism with the code received from the satellite.

The two slaving loops, the code loop and the carrier loop, take into account the Doppler frequency shift in the carrier frequency and in the code, resulting from the relative movement of the aircraft and of the satellite detected. This Doppler shift is measurable in the loops.

The GPS time and position calculations are performed on the basis of the state of the slaving loops at a specified measurement instant. At this instant, the exact state of the phase of the two digital phase-controlled oscillators is read.

The slaving loops provided in the receiver act so as to lock a local frequency onto the carrier frequency received from the satellites. The shift between this local frequency and the stable and known frequency transmitted by the satellites gives an indication of Doppler shift and hence of difference between the velocity of the satellite and the velocity of the receiver along the axis joining the satellite to the receiver.

Consequently, on the basis of the measurements performed on the pseudo-random code, a position termed the "solved position" is calculated, in relation to the terrestrial reference marker; also, on the basis of measurements performed on the carrier frequencies, a velocity is calculated in relation to the terrestrial reference marker.

Figure 2:
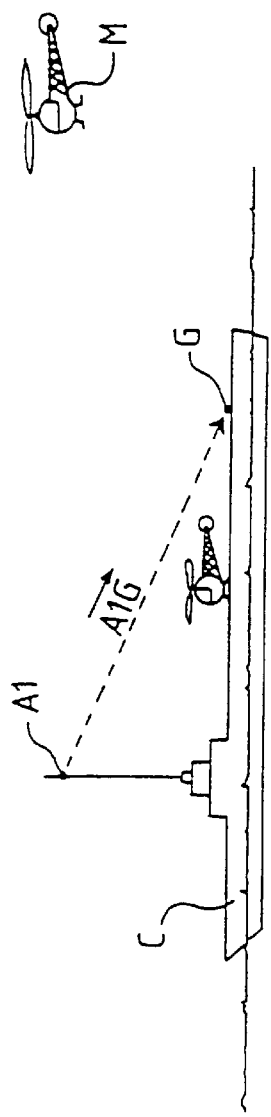
FIG. 2 represents an example of a context of application of the invention.

FIG. 2 represents the context of the application envisaged here: an aircraft carrier or a helicopter carrier constitutes a target C to be reached by a mobile or "hunter" M which is an aircraft or a helicopter requiring to land. A first GPS receiver and radio transmission means are associated with the target. This receiver makes it possible to define the absolute position of the target in relation to the terrestrial reference marker (with the accuracy permitted by the GPS system, that is to say with an accuracy which may be low: it is recalled in this regard that the accuracy is deliberately degraded by fluctuation of the clocks of the satellites).

The GPS receiver of the target makes it possible to calculate its own position, and it also makes it possible indirectly to calculate the position of an ideal landing point G separated from the position of the GPS antenna by a vector A1G which may be referred to as the "lever arm". The absolute position of the point G depends on the fixed and known vector A1G and on the attitude of the ship in terms of heading, roll and pitch. These last three parameters are ascertained in the ship by various on-board instruments (they could be ascertained by differential measurements between two GPS receivers on the ship).

It will be noted that in this type of application, even if the receiver associated with the target were placed at the point G, which would anyhow pose practical difficulties, the aircraft would in general need to ascertain the heading of the ship in order to land coming in from the rear or in any event in a well-specified direction. This item of information will have to be transmitted by radio to the aircraft, and hence there is no inconvenience in also transmitting information regarding the lever arm A1G which separates the antenna from the sighted point. The antenna will therefore be placed at the best location in respect of its own operation, and this will generally be on a mast of the ship, which may be situated several tens of metres from the sighted point G.

The aircraft includes its own GPS receiver and radio reception means for receiving the information sent by the target.

However, instead of the target sending its position calculated by the GPS receiver in relation to a terrestrial reference marker, provision is made according to the invention for it to send only raw measurements of distances with respect to the satellites (also referred to as pseudo-distances), together with the identification of the satellites which it uses.

Provision is also made for the aircraft to use these raw measurements of pseudo-distances, to subtract them from its own raw measurements of pseudo-distances for the corresponding satellites, and to perform a calculation of the relative position of the aircraft with respect to the target directly by using the same position solving equations which normally serve to calculate an absolute position in relation to the terrestrial reference marker.

This processing will therefore be carried out in the GPS receiver of the aircraft, which will be slightly modified so as to be capable of giving this relative position using the same calculating means as it already possesses for calculating its absolute position.

The additional calculating power required to obtain the relative position is therefore extremely limited so that the relative position measurements can be provided at a high rate, for example 10 Hertz, this being desirable for applications of the kind envisaged here.

In the same way, the target transmits its raw measurements of pseudo-velocities (relative radial velocity between the receiver and a satellite along the director axis joining the receiver to this satellite). The radio receiver of the aircraft receives this information, transmits it to the GPS receiver which subtracts it from its own measurements of pseudovelocities, and which calculates directly in relation to the terrestrial reference marker a mobile/target relative velocity vector.

Figure 3:
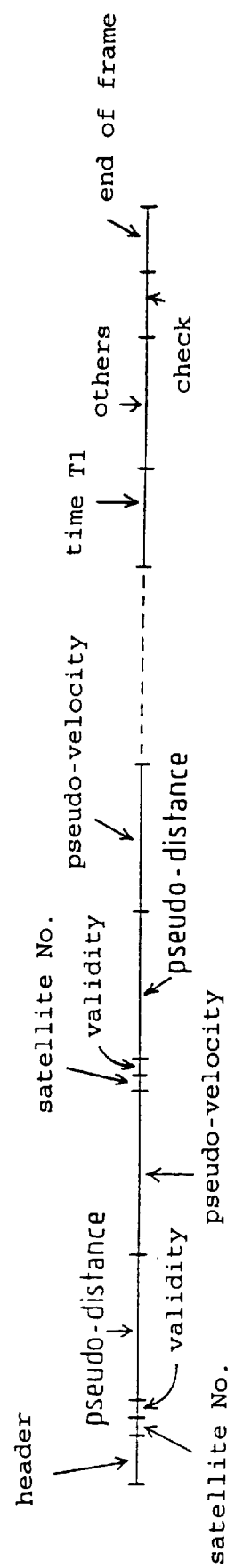
FIG. 3 represents an example of a frame of information transmitted according to the invention from the target to the hunter.
Figure 4:
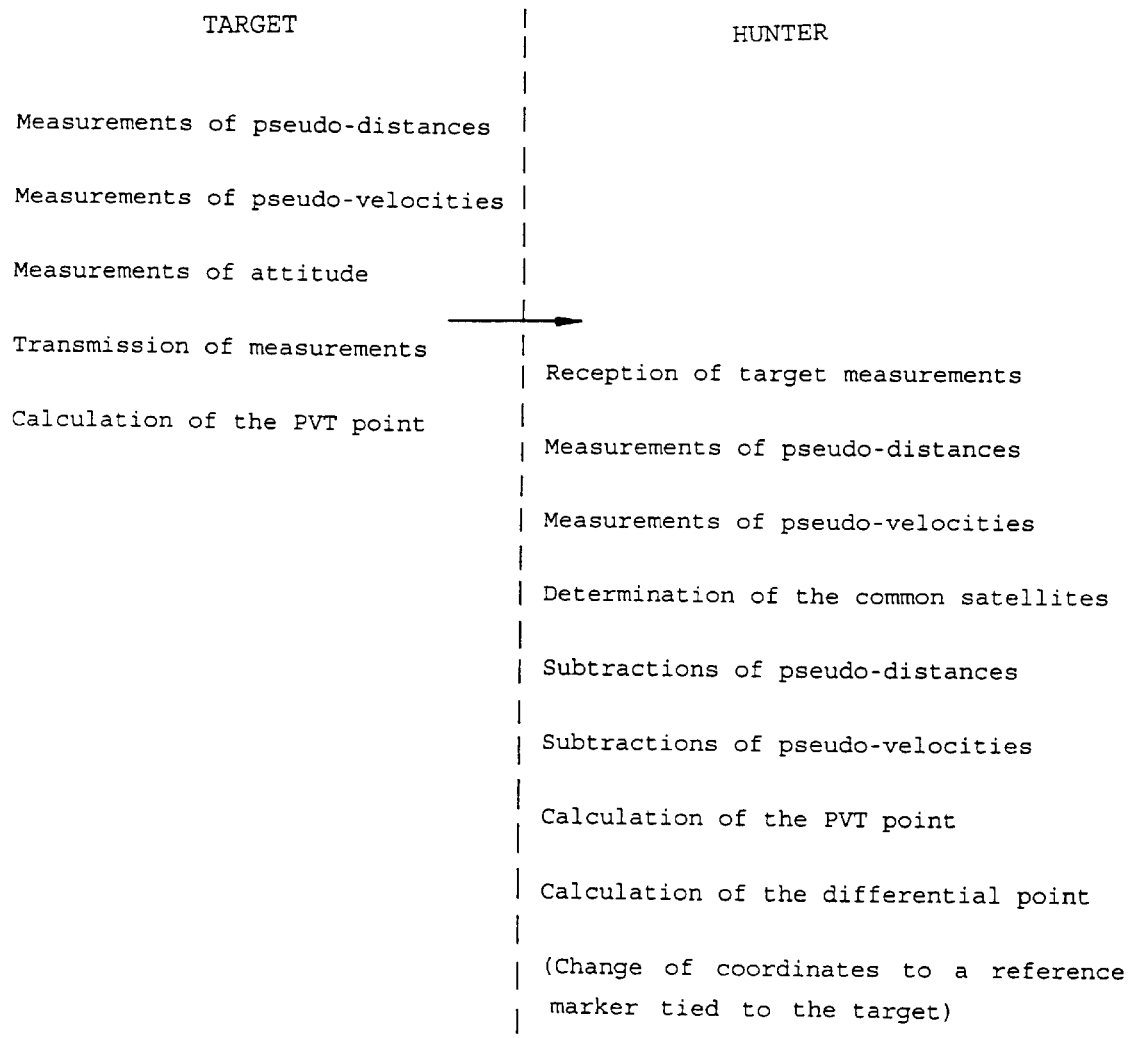
FIG. 4 represents a general flowchart of operations performed according to the invention.

FIG. 3 shows an example of a frame for transmitting radio information from the target to the aircraft.

The frame includes for example in succession, between a start-of-frame header and an end of frame, the following information breakdown:
  in succession for each of the n channels of the receiver of the target (j=1 to n):
    No. of the satellite (5 bits) of rank j;
    satellite validity information item (1 bit);
    pseudo-distance measured to this satellite 24 bits);
    pseudo-velocity measured with respect to this satellite (20 bits);
    followed by the time dT1 of the measurement, common to the n satellites for a given measurement (25 bits);
  a zone of ancillary information whose nature may vary from one frame to the next because this information varies somewhat; for example, the information regarding the vector A1G, as well as the heading, the roll, the pitch may be transmitted piecewise, spread over several frames in this information zone;
  integrity checking bits for the item of information transmitted.

If the frame frequency is 10 Hertz, the bit rate of the information transmitted may be of the order of 6000 bits/second.

The radio receiver of the aircraft verifies the integrity of the message transmitted and transmits all this information to the GPS receiver of the aircraft which performs the following operations:
  storage of the integrated information received from the target, a new frame overwriting the information of the previous frame (except of course the ancillary information which requires several frames in order to be transmitted completely);
  self-measurements of pseudo-distances Pdmi and of pseudo-velocities Pvmi of the aircraft at an instant T2 for m satellites (i=1 to m);
  determination of the satellites which are common to the target and to the aircraft;
  solution for the point so as to determine the absolute position of the aircraft and the time T2, this solution being effected preferably by using only the common satellites;
  updating, by extrapolation, of the measurements of the target made at an instant T1 (sent in the message), so as to realign the measurements of the target with the instant T2; knowing the pseudo-velocity Pvci of the target with respect to satellite i, the pseudo-distance Pdi at the instant T2 is corrected with respect to the instant T1 by the value (T2 −T1) Pvci;
  subtraction of measurements of pseudo-distances of the target and of the aircraft, which are realigned with the instant T2, and subtraction of measurements of pseudo-velocities. These subtractions are performed only for the common satellites used by the target at the time T1 and by the aircraft at the time T2. Those satellites which are not valid for one or the other of the receivers are excluded;
    direct calculation of a relative position and of a relative velocity in relation to a terrestrial reference marker, using the results of the subtractions as input data, and as solving equations the same equations which serve to calculate the PVT point (position, velocity, time) in the receiver of the aircraft; during this calculation, use is made of intermediate values which were calculated for solving for the point of the aircraft so that these intermediate values (which change with each new measurement) serve equally well for the calculation of absolute position and velocity as for the calculation of relative position and velocity;
  possible correction to give a relative position with respect to the sighted point G rather than with respect to the point A1;
  possible change of coordinates to give a relative position with respect to a reference marker tied to the target (with respect to the longitudinal axis of the ship in particular) rather than with respect to a fixed terrestrial reference marker;
  display for the pilot of the result in a form appropriate for an aid to piloting (written information or guidance reticle, etc.).

The raw measurements of pseudo-distances and of pseudo-velocities of the aircraft and of the target are those which are computed by a standard GPS receiver. It will be understood that if the receivers used are sophisticated receivers which include for example carrier-based code smoothing circuits, the raw measurements of pseudo-distances are smoothed measurements and it is the latter which are transmitted by radio. Carrier-based code smoothing is a conventional arrangement consisting in providing as measurement of pseudo-distance an integral of the pseudo-velocity corrected by the actual measurements of pseudo-distances (proportional or proportional and integral correction). In all cases, measurements of pseudo-distance and of pseudo-velocity along each satellite axis are transmitted and not measurements solved in relation to a terrestrial reference marker, except as regards the time which is a solved measurement but the accuracy of which may be less than the sought-after relative position accuracy.

The calculation executed to obtain an absolute position or an absolute velocity in relation to a terrestrial reference marker is as follows:

Let Z be the vector with p components Zj (j=1 to p) representing the measurements with respect to the p satellites common to the target and to the aircraft. Z is a vector of p pseudo-distances for a position calculation or a vector of p pseudo-velocities for a velocity calculation. The principle is the same and a position calculation will be considered in what follows.

Let X be the state vector with 4 components (x, y, z, t) representing the sought-after absolute position (solved position); the first three components represent the actual position, for example in terms of longitude, latitude and altitude, and the fourth component represents the time of the measurement.

The vector X is the solution of the equation $$Z = H.X \quad (1)$$

where H is the matrix of the n×4 direction cosines, that is to say a matrix of n rows of four coefficients $C_{jx}$, $C_{jy}$, $C_{jz}$, 1 (j=1 to p).

The coefficients $C_{jx}$, $C_{jy}$, $C_{jz}$ represent the cosines of the angles between the $j^{th}$ director axis and the Ox, Oy, Oz axes (longitude, latitude, altitude) of the terrestrial reference marker (O being the position of the GPS receiver).

The measurement errors in the various axes of satellites imply that the equation Z=H.X admits no analytical solution if there are more than four satellites, this being the general case.

An additional criterion is customarily fixed in order to find the vector X which best satisfies the equation Z=H.X. This criterion is usually the least squares criterion: we minimize the sum of the distances between the sought-after point X projected onto the director axes (receiver-satellite axes) and the measured position ($Z_j$) along these axes.

In this case, it can be shown that the equation Z=H.X admits the following solution:

$X = (H^T.H)^{-1}.H^T.Z + tm$ (2)

$H^T$ is the transpose of the matrix H.

This solution can be calculated via operations of matrix multiplications and inversions. The lengthiest part of the calculation is then the calculation of $(H^T.H)^{-1}.H^T$, which changes with each new measurement. The result of the calculation performed by the GPS receiver of the hunter in order to provide the absolute PVT point, is immediately reused by the receiver to perform a calculation of relative position $X_r$ on the basis of the same formula (2), using the result $(H^T.H)^{-1}.H^T$ just calculated, and using as input data not the vector Z but a vector $S_r$ of p differential pseudo-distances (or pseudo-velocities) $S_{rj}$. These differential pseudo-distances or pseudo-velocities $S_{rj}$ are the results of subtractions of pseudo-distances (or pseudo-velocities) between target and hunter, satellite by satellite.

The relative position sought, the position of the hunter with respect to the target, is then defined by a four-dimensional relative-position vector $X_r$ in relation to the terrestrial reference marker, according to the formula:

$$X_r = (H^T.H)^{-1}.H^T.S_r \quad (3)$$

Given that the calculation of X is not necessarily performed by matrix inversion, and that it is often performed by iterative approximation algorithms, the calculation of $X_r$ may also be performed iteratively, according to the same algorithm and with the same intermediate calculations as the calculation of X but using as input data the results $S_{rj}$ instead of the components $Z_j$.

The iterative calculation consists of a succession of calculations for each satellite: calculation of a realignment gain $K_j$; calculation of a matrix of intermediate coefficients $P_j$ serving in the realignment gain calculation in the next step and of an estimate of position $X_j$ on the basis of $K_{j-1}$, of $Z_j$ and of the previous estimate $X_{j-1}$.

Typically, in this iterative method, the lengthiest calculation is the calculation of the realignment gain. Since this calculation is necessarily performed by the receiver of the aircraft so as to determine its absolute position, it is employed according to the invention in order to calculate the relative position of the aircraft with respect to the target: the vector $S_r$ of p results $S_{rj}$ of subtractions of pseudo-distances (or pseudo-velocities) is then used as measurement vector and in step j the same realignment gain $K_j$ is used, applying it to this vector $S_r$ rather than to the vector Z.

Hence, at each iteration step an estimate of relative position $X_{rj}$ is calculated on the basis of $K_{j-1}$, $S_{rj}$ and $X_{rj-1}$, so as ultimately to obtain, at the last iteration step, the vector $X_r$ of relative position of the aircraft with respect to the target, with four dimensions in relation to the terrestrial reference marker.

The additional calculating power for obtaining a relative position is very small. Also, this position is very accurate since it eliminates the fluctuation errors in the clocks of the satellites because it performs the calculations directly on the basis of subtractions of pseudo-distances. The same may be said of the calculation of relative velocity.

Typically, the iterative calculation with realignment gain can be performed by the following operations:

calling:
$Z_j$ the component of rank j of the measurement vector
$X_j$ the estimate of the state (position or velocity) vector at step j of the iteration,
$P_j$ a matrix of 4×4 coefficients in step j,
$K_j$ a 4×1 realignment gain vector in step j,
$\sigma_j$ the estimated noise component for the measurement on axis j,
H the n×4 matrix of direction cosines of the n satellites, $(H)^{<j>}$ the $j^{th}$ row of this matrix, and $(H)^{<j>T}$ the transpose of this $j^{th}$ row, the iteration formula is as follows:
$K_j = P_{j-1}.(H)^{<j>T}.[(\sigma_j)^2 + (H)^{<j>}.P_{j-1}.(H)^{<j>T}]^{-1}$
$P_j = P_{j-1} - K_j.(H)^{<j>}.P_{j-1}$
$X_j = X_{j-1} + K_j.[Z_j - (H)^{<j>}.X_{j-1}]$ This method therefore comprises three calculations at any iteration step of rank j, where j varies from 1 to p (p being the number of satellites used simultaneously by the hunter and by the target), that is to say where j represents a particular director axis:

A. calculation of a gain $K_j$, with:
$K_j = P_{j-1}.(H)^{<j>T}.[(\sigma_j)^2 + (H)^{<j>}.P_{j-1}.(H)^{<j>T}]^{-1}$
$P_j$ is a matrix of coefficients calculated in step j; $P_{j-1}$ is therefore this matrix in the previous step.

$\sigma_j^2$ is an estimated noise component for the measurement on axis j.

This noise is a datum which is known a priori, or estimated a priori, resulting mainly from the "selective availability" (or SA) error, this being a clock inaccuracy which affects the satellites, the magnitude of which inaccuracy is given by the satellites themselves in the navigation message, from atmospheric errors of propagation, from the correlation noise estimated in the receiver by a filter which provides this noise directly.

The matrix $P_o$ is initially a diagonal matrix with large coefficients (for example $10^5$)

B. calculation of the matrix $P_j$ with:
$P_j = P_{j-1} - K_j \cdot (H)^{<j>} \cdot P_{j-1}$ C. calculation of a position estimate $X_j$, with:
$X_j = X_{j-1} + K_{j-1} \cdot [Z_j - (H)^{<j>} \cdot X_{j-1}]$ where $X_j$ is the four-dimensional state vector estimated in step j of the iteration, and $Z_j$ is the component of rank j of the position measurement vector, that is to say the measurement on director axis j.

According to the invention, it is therefore proposed to calculate successive estimates $X_{rj}$ via the same formulae, replacing $X_j$ by $X_{rj}$ and $Z_j$ by $S_{rj}$, and reusing the intermediate calculations of $P_j$ and $K_j$.

The state vector $X_r$ of relative position or velocity defines the position of the hunter with respect to the point A1 corresponding to the antenna of the receiver of the target. A translation may be performed so as to obtain the position with respect to the reference point G, the components of the vector A1G being transmitted from the target to the hunter in the guise of ancillary information in the frame sent by radio.

Moreover, in the case in which the hunter receives information by radio from the target regarding the attitude of the latter (especially heading but possibly also roll and pitch), the hunter preferably performs a change of coordinates which gives its relative position with respect to the point G in relation to a reference marker of axes which are fixed with respect to the target and not in a fixed terrestrial reference marker. This is important for example in respect of operations for landing an aircraft on a ship.

Finally, when the point G sighted is separated from the centre A1 of the antenna by a lever arm vector A1G, it is also possible to envisage that lever arm corrections are calculated by the receiver itself, placed on the target, these corrections being applied to the measurements of pseudo-distances so as to send directly measurements of corrected pseudo-distances, that is to say measurements centred on the point G, instead of sending separately measurements of pseudo-distances centred on the point A1 and of lever arm attitude information. The hunter makes direct use of the corrected measurements, representing the pseudo-distances between the point G and each of the satellites observed, to calculate its position with respect to the point G.

It will be noted that the invention is applicable even in cases in which the reference point G is not physically tied to the target which carries the antenna A1, on condition that the hunter knows (or receives by radio from the target) the components of the vector A1G defining the exact point G to be sighted. For example, an application may be envisaged in which the target is a GPS beacon dropped at a spot which is unknown a priori, stationary or moving, but which will serve as a base reference, and the point sighted by a hunter which is a point tied to the target not physically but mathematically by a predetermined vector. Thus, in a particular application, the beacon can define a global homing-in point for several mobiles, but each mobile has to reach a specific point different from the homing-in point, so that each hunter sights a different point. The various sighted points are predefined in terms of relative position with respect to the beacon.

What is claimed is:

1. Process for aiding the piloting of a hunter towards a mobile target, using a first satellite-based positioning receiver associated with the target to provide position and velocity measurements tied to the position and to the velocity of the target, a second satellite-based positioning receiver associated with the hunter to provide position and velocity measurements tied to the position and to the velocity of the hunter, and using a radio transmission device configured to transmit information from the target to the hunter, said process comprising:

periodically transmitting from the target to the hunter, measurements of pseudo-distances representing the distance of the target from n different satellites at a given instant, the identification of these n satellites, a value of the instant of the measurement, measurements of relative pseudo-velocities between the target and each satellite;

performing, in the second receiver, periodic measurements of pseudo-distances representing the distance of the target from plural satellites at a given instant, a value of the instant of the measurement, and measurements of pseudo-velocities between the hunter and each of said plural satellites;

determining in the hunter, which satellites am used both by the hunter and by the target, the number of these satellites being p which is less than or equal to n;

subtracting the pseudo-distances and pseudo-velocities determined by the hunter and those received from the target for each of the p satellites; and directly from the results of said subtractions, calculating relative position and velocity vectors, in relation to a terrestrial reference marker, between the hunter and a point tied to the target.

2. Process according to claim 1, wherein the hunter receives information from the target regarding the components of a vector joining the point and an antenna of the positioning receiver of the target, the receiver of the hunter firstly performing a calculation of relative position with respect to the antenna and then a calculation of relative position with respect to the point.

3. Process according to claim 1, wherein the hunter receives information from the target regarding the attitude of the target and calculates a relative position between the hunter and the point in relation to a reference marker fixed with respect to the target.

4. Process according to claim 1, wherein the point is separated by a lever arm A1G from the center of an antenna of the receiver of the target, and the receiver associated with the target calculates and transmits to the hunter measurements of corrected pseudo-distances which are the pseudo-distances between the point and each of the satellites observed.

5. Process according to claim 1, wherein the receiver of the hunter calculates the absolute position of the hunter at a given instant by performing intermediate calculations which change with each new position measurement, and in that it uses the results of these intermediate calculations to determine directly a relative position with respect to the target at the same measurement instant.

6. System for aiding the piloting of a hunter towards a mobile target, said hunter having a satellite-based positioning receiver and radio reception device configured to receive from the target measurements of pseudo-distances and pseudo-velocities tied to the position of the target with respect to n satellites and the identification of the n satellites, said satellite-based positioning receiver comprising:

means for calculating pseudo-distances and pseudo-velocities of the hunter with respect to plural satellites;

means for determining which satellites are used both by the target and by the hunter, the number of these satellites being p which is less than or equal to n;

means for subtracting, for each of the p satellites, the measurements of pseudo-distances of the hunter and of the target and the measurements of pseudo-velocities of the hunter and of the target; and means for calculating directly from the results of these subtractions, relative position and velocity vectors, in relation to a terrestrial reference marker, between the hunter and a point tied to the target.

7. Process according to claim 2, wherein the hunter receives information from the target regarding the attitude of the target and calculates a relative position between the hunter and the point in relation to a reference marker fixed with respect to the target.

8. Process according to claim 2, wherein, the point being separated by a lever arm A1G from the center of an antenna of the receiver of the target, the receiver associated with the target calculates and transmits to the hunter measurements of corrected pseudo-distances which are the pseudo-distances between the point and each of the satellites observed.

9. Process according to claim 2, wherein the receiver of the hunter calculates the absolute position of the hunter at a given instant by performing intermediate calculations which change with each new position measurement, and in that it uses the results of these intermediate calculations to determine directly a relative position with respect to the target at the same measurement instant.

10. Process according to claim 3, wherein the receiver of the hunter calculates the absolute position of the hunter at a given instant by performing intermediate calculations which change with each new position measurement, and uses the results of these intermediate calculations to determine directly a relative position with respect to the target at the same measurement instant.

11. Process according to claim 4, wherein the receiver of the hunter calculates the absolute position of the hunter at a given instant by performing intermediate calculations which change with each new position measurement, and uses the results of these intermediate calculations to determine directly a relative position with respect to the target at the same measurement instant.

* * * * *